US012617092B2

(12) United States Patent　　　　　(10) Patent No.:　US 12,617,092 B2

Hazan　　　　　　　　　　　　　　　(45) Date of Patent:　　　May 5, 2026

(54) METHOD AND A SYSTEM FOR DETECTING POSSIBLE COLLISIONS OF OBJECTS IN AN INDUSTRIAL MANUFACTURING ENVIRONMENT

(71) Applicant: Siemens Industry Software Ltd., Tel Aviv (IL)

(72) Inventor: Moshe Hazan, Elad (IL)

(73) Assignee: Siemens Industry Software Ltd., Tel Aviv (IL)

( * ) Notice: Subject to any disclaimer, the term of this patent is extended or adjusted under 35 U.S.C. 154(b) by 212 days.

(21) Appl. No.: 18/701,288

(22) PCT Filed: Oct. 20, 2021

(86) PCT No.: PCT/IB2021/059679

§ 371 (c)(1),
(2) Date: Apr. 15, 2024

(87) PCT Pub. No.: WO2023/067374

PCT Pub. Date: Apr. 27, 2023

(65) Prior Publication Data

US 2025/0256400 A1　　Aug. 14, 2025

(51) Int. Cl.
B25J 9/16　　　　　(2006.01)

(52) U.S. Cl.
CPC ........... B25J 9/1666 (2013.01); B25J 9/1671 (2013.01)

(58) Field of Classification Search
CPC ... B25J 9/1666; B25J 9/1671; G05B 19/4069; G05B 2219/39082; G05B 2219/40317; G05B 2219/40476; G05B 16/41885
See application file for complete search history.

(56) References Cited

U.S. PATENT DOCUMENTS

| | | | | |
|---|---|---|---|---|
| 6,184,899 B1 * | 2/2001 | Akemann | ............... | A63F 13/10 |
| | | | | 345/475 |
| 6,310,619 B1 * | 10/2001 | Rice | ......................... | G06F 3/016 |
| | | | | 345/420 |
| 6,420,698 B1 * | 7/2002 | Dimsdale | ............. | G01C 15/002 |
| | | | | 250/234 |
| 6,549,219 B2 * | 4/2003 | Selker | ................... | G06F 3/0482 |
| | | | | 345/902 |
| 6,714,201 B1 * | 3/2004 | Grinstein | ................ | G06T 13/20 |
| | | | | 700/61 |
| 6,917,850 B2 * | 7/2005 | Kamishio | ............ | G05B 19/414 |
| | | | | 700/83 |
| 7,054,718 B2 * | 5/2006 | Miyamoto | ............. | G06N 3/008 |
| | | | | 180/8.1 |
| 7,158,970 B2 * | 1/2007 | Chang | ................. | G06F 16/9032 |
| | | | | 707/999.005 |

(Continued)

*Primary Examiner* — Bhavesh V Amin

(74) *Attorney, Agent, or Firm* — Laurence A. Greenberg; Werner H. Stemer; Ralph E. Locher

(57)　　　　　　ABSTRACT

Systems such as computer-aided design, visualization, and manufacturing ("CAD") systems, product lifecycle management ("PLM") systems, product data management ("PDM") systems, and similar systems, all manage data for products and other items (collectively, "Product Data Management" systems or PDM systems). More specifically, in such systems the enablement of an industrial manufacturing environment for detecting possible collisions of movable objects in an industrial manufacturing environment is necessary.

15 Claims, 5 Drawing Sheets

(56) References Cited

U.S. PATENT DOCUMENTS

| | | | |
|---|---|---|---|
| 7,296,222 B1 * | 11/2007 | Sakairi | G06F 16/986 |
| | | | 707/E17.118 |
| 7,346,478 B2 * | 3/2008 | Walacavage | G05B 19/41885 |
| | | | 700/165 |
| 7,546,543 B2 * | 6/2009 | Louch | G06F 8/38 |
| | | | 715/767 |
| 7,551,801 B2 * | 6/2009 | Gupta | G06V 40/28 |
| | | | 382/276 |
| 7,561,159 B2 * | 7/2009 | Abel | G06T 13/20 |
| | | | 345/473 |
| 7,580,816 B2 * | 8/2009 | Thompson | G06F 30/00 |
| | | | 703/2 |
| 7,756,692 B2 * | 7/2010 | Glass, III | G06N 3/004 |
| | | | 703/2 |
| 7,860,691 B2 * | 12/2010 | Beltran | G06F 30/00 |
| | | | 703/1 |
| 7,860,839 B2 * | 12/2010 | Cisler | G06F 11/1469 |
| | | | 715/229 |
| 7,979,158 B2 * | 7/2011 | Sladek | B25J 9/1664 |
| | | | 700/246 |
| 10,126,729 B2 * | 11/2018 | Bretschneider | B25J 9/1666 |
| 10,160,114 B2 * | 12/2018 | Watts | B25J 9/1612 |
| 12,118,688 B1 * | 10/2024 | Dean | G06T 19/20 |
| 2002/0122072 A1 * | 9/2002 | Selker | G06F 3/0482 |
| | | | 715/834 |
| 2005/0259107 A1 * | 11/2005 | Olson | G06T 15/005 |
| | | | 345/582 |
| 2005/0273200 A1 * | 12/2005 | Hietmann | B25J 9/1666 |
| | | | 700/248 |
| 2006/0155418 A1 * | 7/2006 | Bradbury | G05B 19/4099 |
| | | | 700/182 |
| 2006/0176001 A1 | 8/2006 | Haunerdinger | |
| 2007/0171223 A1 * | 7/2007 | McArdle | G06T 19/00 |
| | | | 345/420 |
| 2007/0233298 A1 * | 10/2007 | Heide | G06F 30/00 |
| | | | 700/118 |
| 2008/0114492 A1 * | 5/2008 | Miegel | B25J 9/1664 |
| | | | 901/6 |
| 2009/0074979 A1 * | 3/2009 | Krogedal | G05B 19/404 |
| | | | 901/29 |
| 2010/0223008 A1 * | 9/2010 | Dunbabin | G05D 1/0274 |
| | | | 701/301 |
| 2010/0259546 A1 * | 10/2010 | Yomdin | G06T 7/12 |
| | | | 345/473 |
| 2010/0299121 A1 | 11/2010 | Bond et al. | |
| 2011/0066282 A1 * | 3/2011 | Bosscher | B25J 9/1676 |
| | | | 700/255 |
| 2012/0290271 A1 * | 11/2012 | Diguet | G06T 19/00 |
| | | | 703/1 |
| 2013/0016090 A1 * | 1/2013 | Nixon | G06T 17/20 |
| | | | 345/419 |
| 2013/0151008 A1 | 6/2013 | Bosscher et al. | |
| 2013/0178980 A1 * | 7/2013 | Chemouny | B25J 9/1671 |
| | | | 700/255 |
| 2015/0190926 A1 * | 7/2015 | Miegel | B25J 9/1682 |
| | | | 700/248 |
| 2015/0239127 A1 * | 8/2015 | Barajas | B25J 9/1671 |
| | | | 700/253 |
| 2015/0336269 A1 | 11/2015 | Linnell et al. | |
| 2016/0031082 A1 | 2/2016 | Hazan et al. | |
| 2017/0004365 A1 * | 1/2017 | Ono | B60K 35/22 |
| 2018/0356819 A1 * | 12/2018 | Mahabadi | B60W 30/00 |
| 2019/0072980 A1 * | 3/2019 | Kumar | G08G 1/166 |
| 2019/0187715 A1 * | 6/2019 | Zhang | G05D 1/0268 |
| 2019/0235498 A1 * | 8/2019 | Li | B60W 60/001 |
| 2019/0243370 A1 * | 8/2019 | Li | B60W 30/0953 |
| 2019/0317509 A1 * | 10/2019 | Zhang | G05D 1/0088 |
| 2019/0346851 A1 * | 11/2019 | Liu | G05D 1/0217 |
| 2020/0209872 A1 * | 7/2020 | Xu | G05D 1/0221 |
| 2020/0310446 A1 * | 10/2020 | Zhu | G05D 1/0217 |
| 2020/0310451 A1 * | 10/2020 | Zhu | G05D 1/0223 |
| 2020/0324413 A1 * | 10/2020 | Lin | G05B 19/19 |
| 2020/0379474 A1 * | 12/2020 | Zhang | G05D 1/0223 |
| 2021/0026358 A1 * | 1/2021 | Sheu | G05D 1/0274 |
| 2021/0064015 A1 * | 3/2021 | Mariani | G05B 19/4188 |
| 2021/0086358 A1 * | 3/2021 | Northcutt | G06F 17/18 |
| 2021/0183159 A1 * | 6/2021 | Chadha | G06T 17/20 |
| 2022/0040859 A1 * | 2/2022 | Luo | G06T 17/20 |
| 2022/0383540 A1 * | 12/2022 | Lee | B25J 9/1697 |
| 2022/0388165 A1 * | 12/2022 | Walsh | B25J 9/1633 |
| 2022/0414974 A1 * | 12/2022 | Zakharov | G06T 7/50 |
| 2023/0115758 A1 * | 4/2023 | Kassar | B60W 60/001 |
| | | | 701/93 |
| 2023/0123463 A1 * | 4/2023 | Lin | B25J 13/08 |
| | | | 700/248 |
| 2023/0174258 A1 * | 6/2023 | Lian | G06T 7/13 |
| | | | 53/475 |
| 2023/0300336 A1 * | 9/2023 | Rondao Alface | H04N 19/20 |
| | | | 375/240.02 |
| 2024/0066698 A1 * | 2/2024 | Campos Macias | B25J 9/1676 |
| 2024/0087136 A1 * | 3/2024 | Waez | B60W 60/0027 |
| 2024/0131706 A1 * | 4/2024 | Sundaralingam | B25J 9/1664 |
| 2024/0156553 A1 * | 5/2024 | Aouachria | A61B 34/77 |
| 2024/0233189 A1 * | 7/2024 | Graziosi | G06T 9/001 |
| 2024/0358454 A1 * | 10/2024 | Maillet | A61B 34/30 |
| 2024/0408759 A1 * | 12/2024 | Faulhaber | B25J 9/1664 |
| 2025/0256400 A1 * | 8/2025 | Hazan | B25J 9/1671 |
| 2025/0265936 A1 * | 8/2025 | Reagan | G05D 1/0214 |

* cited by examiner

Figures 5A, 5B, 5C, 5D, 6:
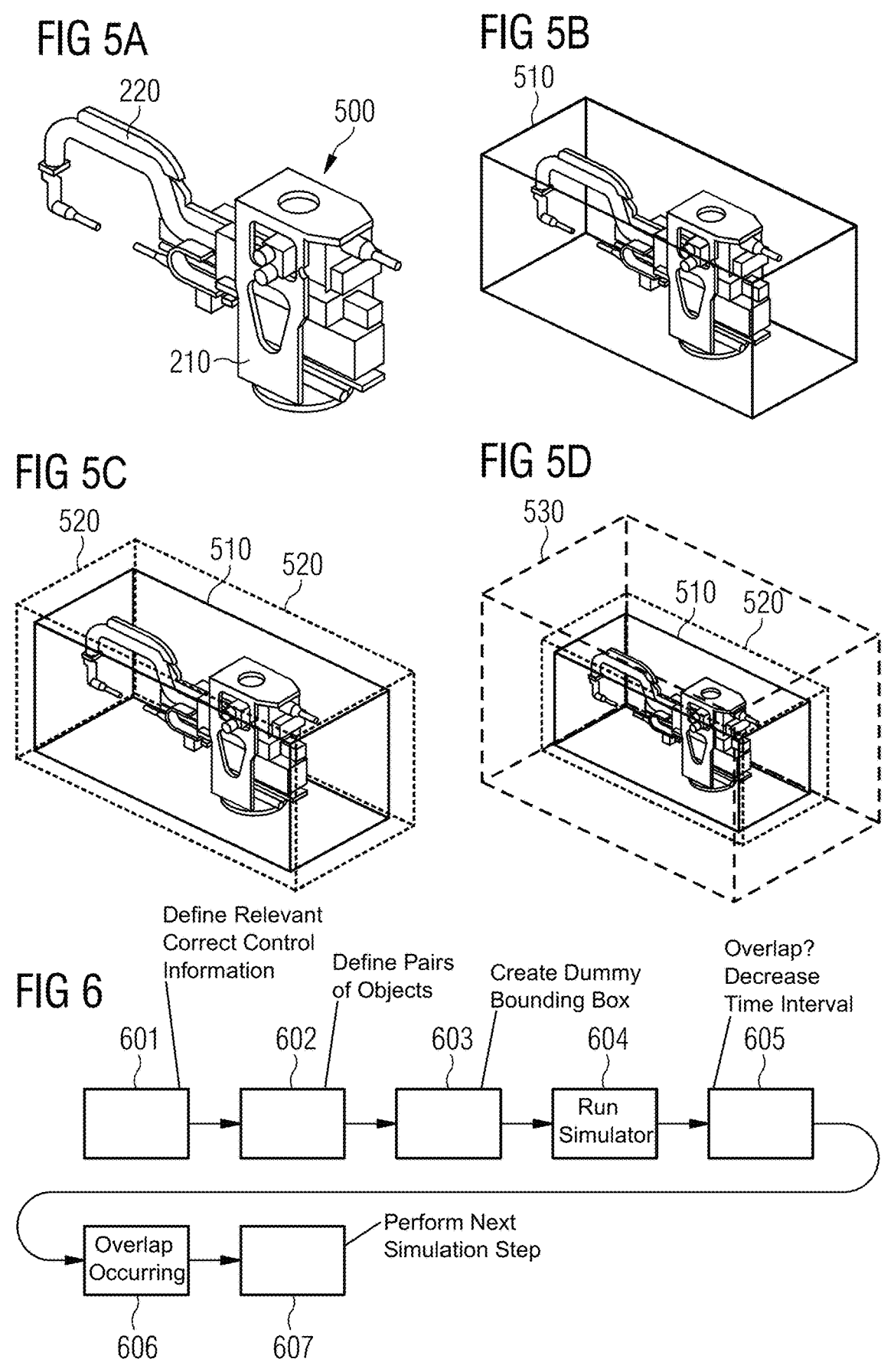

Define Relevant
Correct Control
Information

Define Pairs
of Objects

Create Dummy
Bounding Box

Overlap?
Decrease
Time Interval

601

602

603

604
Run
Simulator

605

Overlap
Occurring

Perform Next
Simulation Step

606

607

METHOD AND A SYSTEM FOR DETECTING POSSIBLE COLLISIONS OF OBJECTS IN AN INDUSTRIAL MANUFACTURING ENVIRONMENT

TECHNICAL FIELD

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to the enablement of an industrial manufacturing environment for detecting possible collisions of movable objects in an industrial manufacturing environment.

BACKGROUND OF THE DISCLOSURE

In industrial manufacturing environments, there exist a need to properly orchestrate the execution of the production steps which are contributed by a usually high number of production resources, robots, materials, personnel, conveyors and the like. Usually, a high number of production steps is executed automatically by the proper operation of robots and/or the proper cooperation of robots and humans. For this purpose, the production controller and/or the controller of the resources receive a set of relevant object control information, e.g. control data for the movement of the robots etc.

In robotic cells of manufacturing facilities, each physical industrial robot is often required to execute multiple tasks in parallel. Such multiple parallel tasks of a single robot usually consist of one single main robotic motion task and several minor robotic logic tasks. As used herein, the term "motion task" denotes the main robotic task which typically comprises a set of kinematic operations and a set of logic operations. As used herein, the term "logic task" denotes a minor robotic logic task comprising a set of logic operations and no kinematic operation.

The multiple different robotic tasks are executed by the physical robots by running, on their own robotic controllers' threads or processes, corresponding robotic programs on a set of operands (the relevant object control data). The codes of such robotic programs are usually written in a robotic programming language, usually a native language of the specific robot's vendor and model. Examples of such native robotic languages include, but are not limited by, native robotic languages supported by robot's vendors e.g. like Kuka, ABB, Fanuc. Alternatively, the user can use a CAR tool, like Process Simulate® and others that enable the user to program the robot by 3D objects (locations etc.) and generic OLP command. At download, this data is then converted into the specific controller native code.

Simulation software applications for industrial robots should preferably fulfil the requirement of enabling the simulation of all different multiple tasks performed by the several physical industrial robots on the shop floor.

This requirement is particularly important for virtual commissioning systems which enable production optimizations and equipment validations.

In order to concurrently simulate all the multiple robotic tasks, a simulating system of the general industrial environment is usually required to concurrently execute all the production operations incl. the robot programs of all the plurality of robot controllers of a production environment.

Since today's production cells do comprise more and more robots, the capability of simulating a full robotic cell with real time performances becomes a critical issue.

The robotic simulation is expected to be as realistic as possible by mirroring the execution of all the robotic tasks of the involved physical robots and by providing high performances in term of execution time by achieving a virtual time as close as possible to the real time.

In fact, for example, having a high performing simulation execution time is important for enabling synchronizations with the PLC running code and for preventing PLC code's exits with "time out" errors.

Hence, a simulation on the industrial environment, in particular on the robotic simulation application, is required to realistically simulate the behavior of the industrial environment and the multiple robotic tasks of a plurality of robots by executing, in a concurrent and high performing manner, the plurality of main robotic motion programs together with the plurality of sets of robotic logic programs.

For complex industrial cells, having dozens of robots each executing dozens of tasks, this requirement implies running a robotic simulation with high performances for several hundred robotic programs or more thereby also enabling a user to detect possible collisions of the production resources, such as robots, conveyors, but also humans which may act interactively together with the robot in the same production environment.

Nowadays, high performances in simulating such complex robot cells may be achieved by executing hundreds of parallel robotic programs in several CPUs, in clusters of computers or on super computers. However, today's common scenario is that industrial robotic simulations are mostly executed on computers with common resources rather than on super computers.

Therefore, for cells having a plurality of robots, today's robotic simulations on common computers are typically executed with the help of one or more of the following expedients;

executing only the robotic motion programs, while ignoring robotic logic programs;

executing the robotic motion programs, while manually modeling robotic logic tasks by rewriting their logic programs native codes by using logic blocks;

executing robotic motion programs, while connecting to external Virtual Robot Controllers ("VRCs") able of executing the robotic logic tasks.

Unfortunately, current robotic simulation techniques on common computers have the drawbacks of being cumbersome and of requiring workarounds, of introducing simulation errors, and/or of not providing realistic and high-performing simulations.

Further, the detection of collisions has to be done for several reasons prior to the physical execution of the manufacturing operations on the shop floor. Typically, industrial robotic factories are very crowded (this situation is rather growing over the years) and a reliable validation which proofs that there do not occur any collisions during the robotic execution of the production tasks is a must for clear and well-known reasons, such as risk for workers (humans), risk for equipment, such as robots, tools, etc., risk for the product itself, overall damage, shutdown of the factory/production lines, extra time for the re-programming of the robots, regulation rules and the like.

Unfortunately, the detection of collisions in industrial robotic factories is very time consuming. The challenge for the CAR tools (Computer Aided Reality) is to maintain the ability to execute an accurate collision detection during the simulation but to keep at the same time a real-time simulation performance. Additionally, the detection of the collisions is done on the basis of sample time intervals. This routine is almost per definition problematic as the user has to keep in mind that a collision event can be missed when occurring in-between two time intervals.

Improved techniques are therefore desirable.

SUMMARY OF THE DISCLOSURE

Various disclosed embodiments include methods, systems, and computer readable mediums for detecting possible collisions of movable objects in an industrial manufacturing environment, comprising the steps of:

a) defining for each movable object a set of relevant object control information enabling the calculation of maximal possible translation of the object for a given time interval;

b) defining a number of pairs of objects that may have a potential for collision;

c) creating for each object of the defined pairs of objects a dummy bounding box, said dummy bounding box providing a volume in response to the calculated maximal possible translation of the object at the end of a given time interval;

d) determining in a simulation step for a simulated movement of the object according to the set of relevant object control information after a given time interval whether an overlap of the dummy bounding boxes of the objects assigned to a pair of objects occurs, and e) in case an overlap occurs, creating for each object involved in the overlap a new dummy bounding box, said new dummy bounding box providing a volume in response to the calculated maximal possible translation of the object at the end of a fractional time interval of said given time interval;

f) determining in a simulation step for a simulated movement of the object according to the set of relevant object control information after the fractional interval whether an overlap of the new dummy bounding boxes of the objects assigned to a pair of objects occurs, g) in case that still an overlap occurs further reducing the fractional time interval and repeating the steps e) and f) or reviewing the real movement of the objects for deepened analysis whether a collision occurs or not.

Further preferred embodiment of the present invention are given in the attached dependent claims.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 5 schematically illustrates the concept of dummy bounding boxes for a robot, starting from a real object and its exact bounding box; and FIG. 6 illustrates a flowchart for detecting possible collisions of movable objects in an industrial manufacturing environment.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for facilitating a concurrent simulation of multiple robot tasks have performance drawbacks on common computers. The embodiments disclosed herein provide numerous technical benefits, including but not limited to the following examples.

With embodiments, a virtual simulation system running on a common computer is empowered to concurrently simulate multiple robotic tasks of a plurality of robots with acceptable performances. With embodiments, a virtual simulation system is enabled to realistically simulate the tasks within the industrial environment, and herein particularly the multiple robotic tasks of a plurality of robots in an industrial cell with close to real-time performances.

With embodiments, a virtual simulation system is facilitated to concurrently execute a CAR tool with a number of add-ons\plug-ins\external application\external configuration files etc and multiple robotic programs written in their own original native codes with acceptable real-time performances. Embodiments save CPU time in case of robotic simulations of several concurrent robotic logic programs.

With embodiments, a realistic virtual commissioning simulation is enabled to run on a computer aided reality tool (CAR tool), such as a robotic simulation platform, like e.g. Process Simulate of Siemens Corporation, departing from robotic programs written in their original native coding language.

Embodiments provide encapsulation properties by enabling the whole simulation to run on a simulation platform like Process Simulate without requiring additional-external VRC connections.

Figure 1:
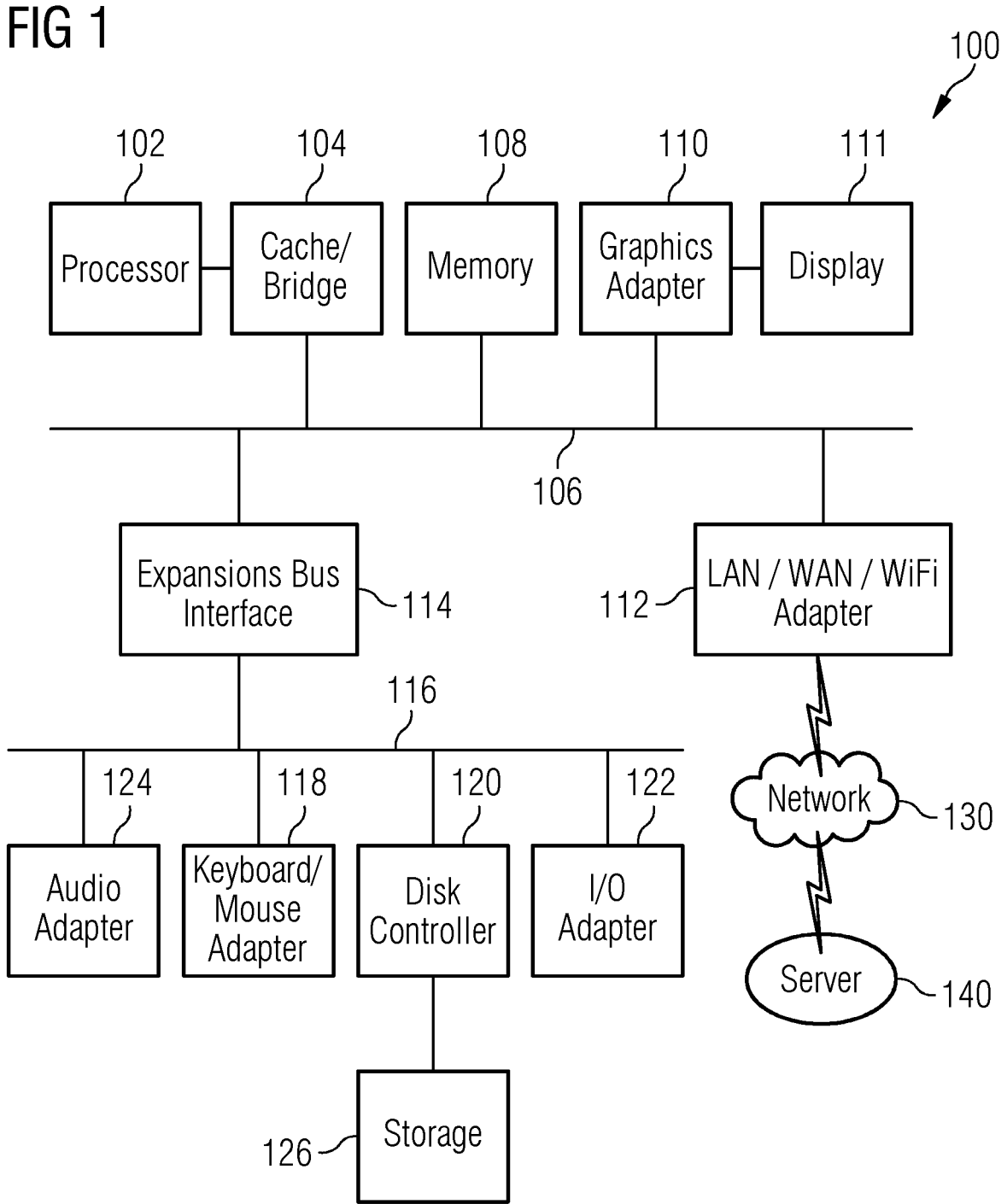
FIG. 1 illustrates a block diagram of a data processing environment in which an embodiment can be implemented.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/ Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

In an exemplary embodiment, the main algorithm steps for facilitating a concurrent simulation of multiple tasks of a plurality of robots in a virtual environment are illustrated below.

Assume for illustration purposes that this exemplary embodiment refers to a simulation scenario (not shown) of an industrial cell with a plurality of industrial robots, each robot foreseen to concurrently execute different tasks consisting of single motion task and a set of logic tasks, and with a plurality of AGVs, humans, conveyors and the like. The concurrent simulation of the multiple tasks of the robots is performed by concurrently executing the corresponding robotic motion programs and the logic programs of the robots on sets of operands as well as the motion programs for the AGV and conveyors as well as the operational tasks for the humans.

Figure 2:
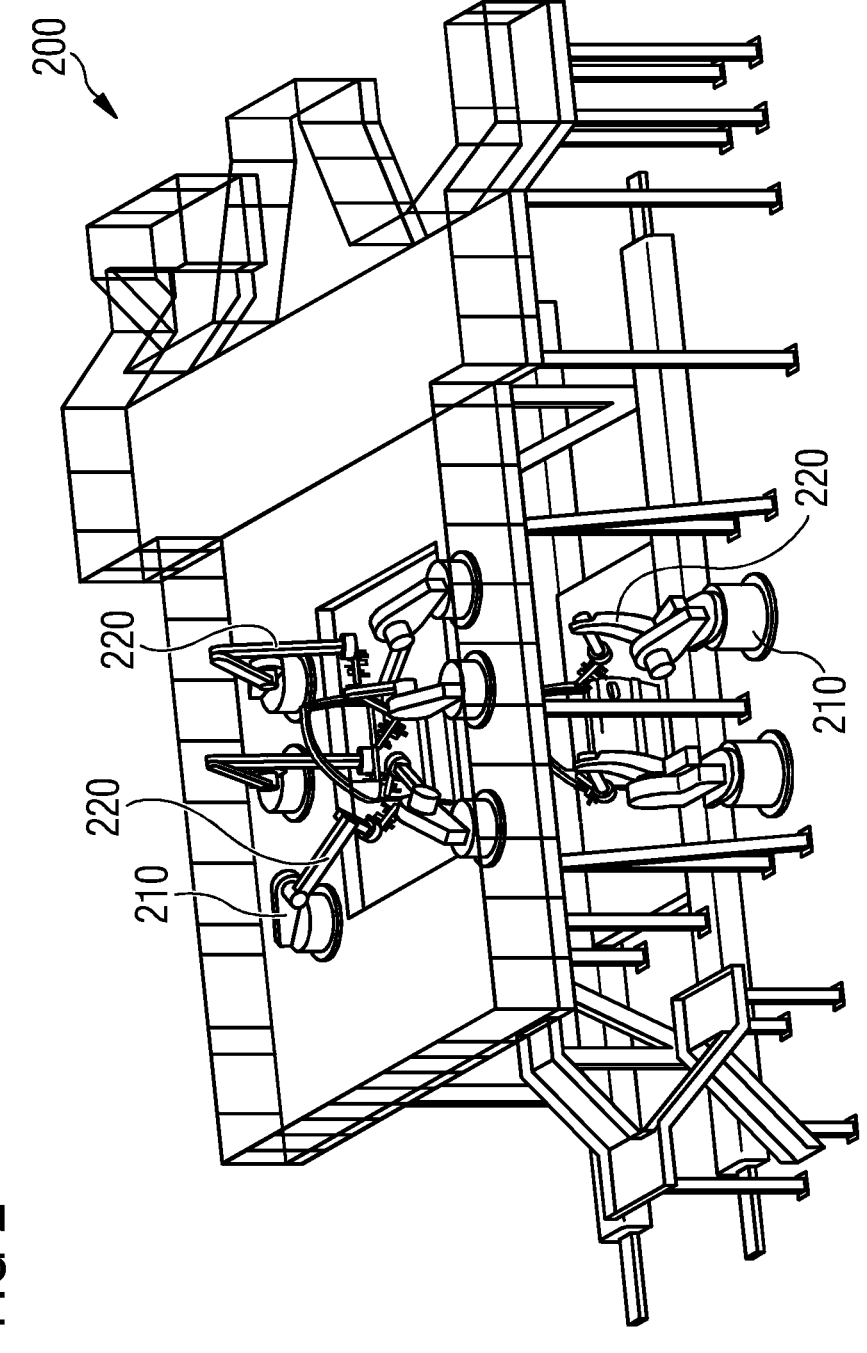
FIG. 2 illustrates a typical industrial robotic environment comprising a significant number of movable objects, here robots and their movable joints in a car manufacturing environment, such as a welding line.

FIG. 2 now schematically a typical industrial robotic environment 200 comprising a significant number of movable objects, here robots 210 and their movable joints 220 in a car manufacturing environment, such as a welding line. It becomes apparent just from the image shown in FIG. 2 and taken from a CAR tool that the plurality of robots concentrated in a rather compact volume and the variety of the tasks and thus the movements of the joints 220 of the robots 210 need to be checked for a possible collision event during the course of the manufacturing process. In order to execute a fast and reliable collision detection for this typical industrial robotic environment 200 a data processing environment is required which centrally comprises a computational resource as simulations engine running a CAR application that allows to simulate the movements and logic operations of the industrial objects involved in the industrial robotic environment represented by the CAR application. A large number of add-ons\plug-ins\external application\external configuration files etc. are connected to the simulation engine in order to run a full simulation of the complete industrial robotic environment 200. Once these add-ons\plug-ins\external application\external configuration files etc. are installed and thus provide their respective simulation information to the simulation engine, the simulation engine can execute a full simulation of the industrial scenario for a given period of time while this period of time is subdivided into a pre-defined number of time intervals at a given length.

Figure 3:
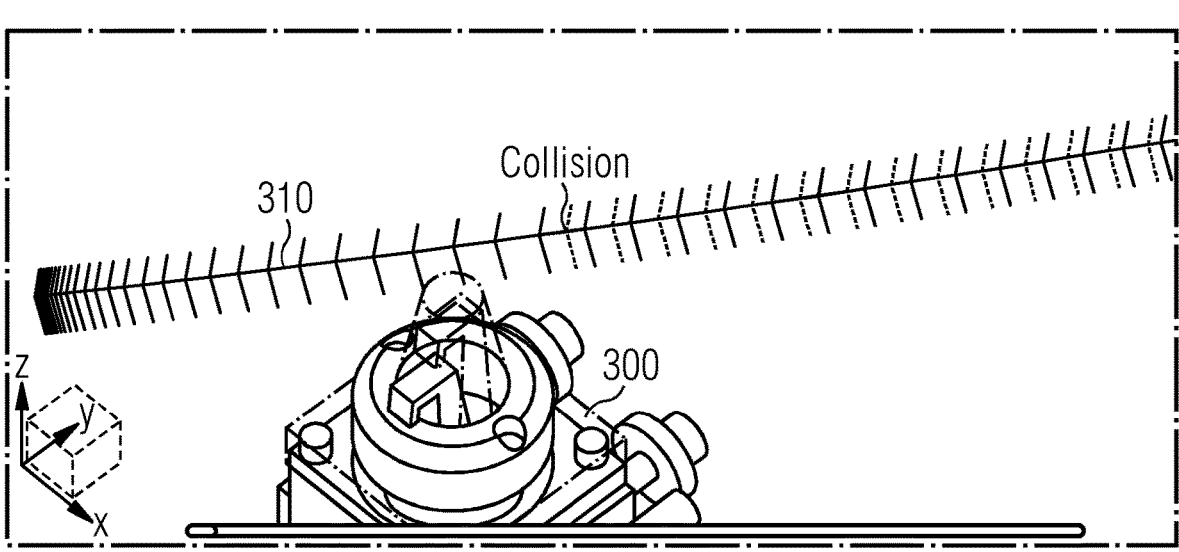
FIG. 3 schematically illustrates a robot and the trajectory of its joint for a plurality of simulation steps.

FIG. 3 now shows schematically a robot 300 and its trajectory 310 during the operation. The simulation of the trajectory uses the relevant control information that is programmed for the operation of this robot 300. Along this trajectory, the simulation is executed in simulation step having a distinct length. Approximately at half of the trajectory, a possible collision event occurs since another object interferes with its trajectory into the trajectory of the robot 300.

Figure 4A:
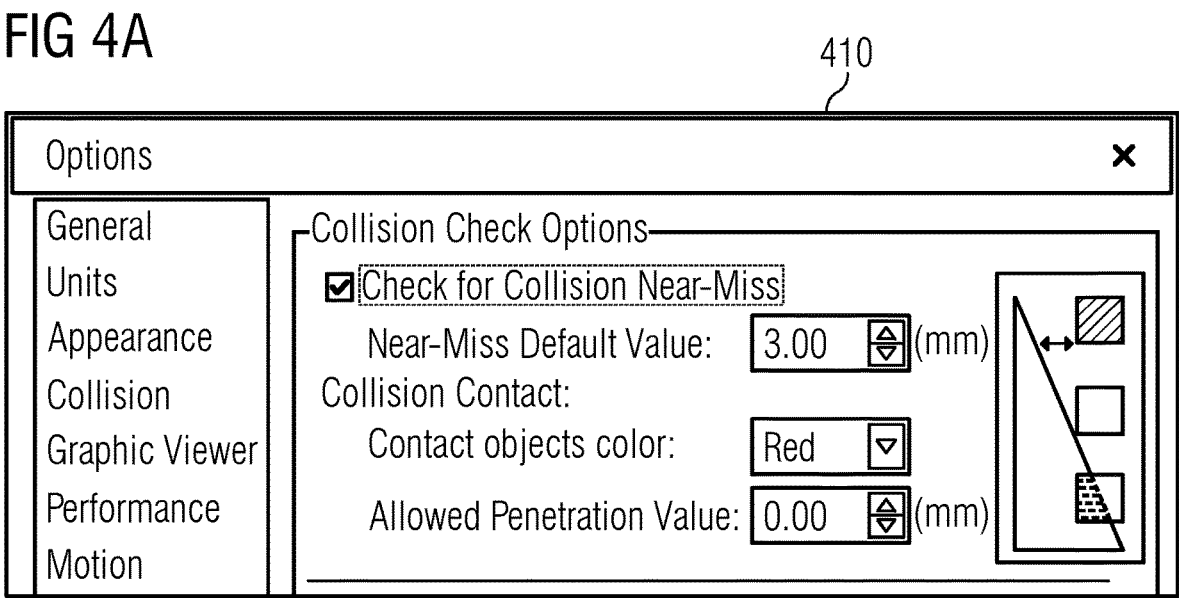
FIG. 4 schematically illustrates (a) the user interface of a Near-Miss-validation tool and (b) the user interface of the collision detection tool according to the present invention.

In order to avoid these collisions, the user may use a near miss validation tool as illustrated in FIG. 4*a* with the respective user interface 410. Unfortunately, this tool requires a lot of computational resources, thus causing problems in the performance of the CAR tool. The present invention now introduces a new concept for the collision detection by using a specific way of trajectory analysis of movable objects as explained hereinafter.

A full simulation on the industrial robotic scenario which comprises usually a number of resources, such as machines, robots, material, conveyors and human operators is essential for the proper working of the real objects at shop floor. This industrial robotic scenario is provided for the full virtual study as input data for the CAR tool (simulations engine) that runs the simulation thereby using input data from and providing output data to a number of modules (add-ons\plug-ins\external application\external configuration files etc.). The full simulation is executed for a predefined period of time that is subdivided into a number of time intervals. These time intervals typically may have depending on the scope of the full simulation a length of a few ms up to 2500 ms. For each time interval, the results of the simulation are recorded in a simulation file that mandatorily comprises the time stamp (or the indication for the specific time interval) and the position data for the industrial objects that are comprised in the industrial robotic scenario forming the basis for the full simulation process.

The present method for detecting possible collisions of the movable objects, here the robots and their movable joints, in the industrial robotic manufacturing environment, comprises in essence the following steps:

For each object a set of relevant object control information is defined. This object control information for example comprises the information on the robotic program of task which in detail comprises the information about the movement of the joints and the like. Further, this information may comprise values for the maximum acceleration of the joints and other parameters specifically defined for the physical movements of the robot. This object control information for the basis for the calculation of a maximal possible translation of the object for a given time interval. This value for the maximum possible translation is essential for the concept of dummy bounding boxes which will be explained a few lines below.

Figure 4B:
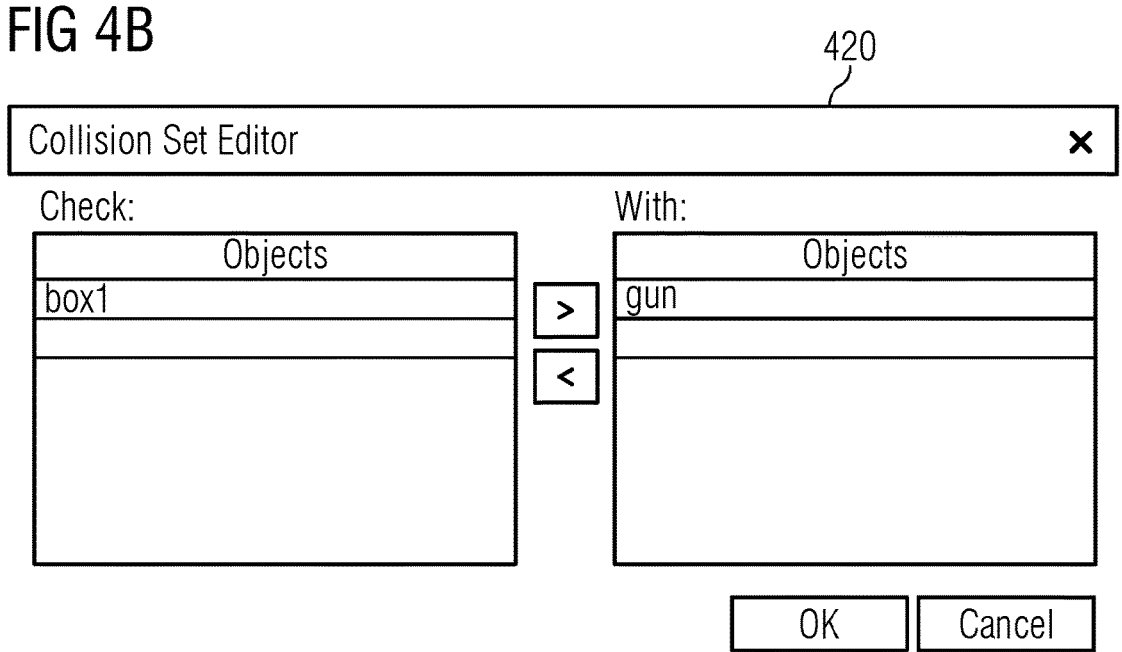

In order to increase the efficiency of the simulation, the user defines a number of pairs of objects that may have a potential for collision in the industrial robot environment as represented by the user interface 420 shown in FIG. 4*b*. Considering now the industrial robotic environment shown in FIG. 2, potential pairs of objects for the detection of possible collisions are therefore preferably objects that are disposed adjacent to each other or directly opposite to each other. Thus, it is now required to check for collisions for those objects which are technically out of reach relative to each other.

Once that these pairs of objects are defined, for each object of the defined pairs of objects a dummy bounding box is determined, said dummy bounding box thereby providing a volume of protection in response to the calculated maximal possible translation of the object at the end of a given time interval. This is represented in FIG. 5, where FIG. 5*a* shows the real object 500 as is and FIG. 5*b* the exact bounding box 510 of the real object. FIG. 5*c* now illustrates the concept of the dummy bounding boxes with a first dummy bounding box DBB 520 which represents a protected volume for the maximum translation of the real object 500 and its joint resp. within a first given time interval T1. FIG. 5*d* now shows a second dummy bound box DBB 530 which is similar to the DBB 520 but now considers the maximum translation of the real object 500 for a second given time interval T2 which is larger than the time interval T1. In other words, during this longer time interval T2, the real object is of course able to reach at least hypothetically positions beyond the first DBB 520. Thus, the volume of the DBB 530 is larger than the volume of the DBB 520. The first time interval T1 can be chosen to range from 0.01 sec to 0.5 sec, here for example 0.1 sec. The second time interval T2 can be chosen to range from 0.1 sec to 1 sec. and is here chosen to be 0.5 sec.

Now, while the simulation is executed for the next time interval of length T2, it is determined in the simulation step for a simulated movement of the object according to the set of relevant object control information after this given time interval T2 whether an overlap of the dummy bounding boxes BDD 530 of the objects assigned to a pair of objects occurs. The comparison is just down by checking whether the two DBB 530 of the two objects do have an overlapping partial volume in common. If not, the risk for collision is zero because the two objects are out of reach relatively to each other.

For the further explanation, it is now assumed that an overlap of the DBB 530 of two objects has occurred on the simulation time line at 10.0 sec. Now, only for these two objects the simulation is repeated starting at point 10 sec (in other words, for time interval ending at 10.0 sec., the overlap has occurred). Now, only for these two objects involved in the overlap, the length of the simulation step is lowered from T2 to T1 and the first dummy bounding boxes BDD 520 are now relevant for the collision check in the next time step from 10.0 sec. to 10.1 sec (instead of 10.0 to 10.5 sec). Since the first new dummy bounding boxes BDD 520 provide the volume in response to the calculated maximal possible translation of the object at the end of this fractional time interval T1 of said given longer time interval T2, the respective DBB 520 are also smaller as shown in FIG. 5. Now, the movements are the respective positions of the DBB 520 are defined newly in the simulation every 0.1 sec. But this collision check is only done for the objects that have collided.

Simple Example

If the simulation is at time point 10.0, and once all movable objects have been moved according to their programmed trajectory, the check is made if there is a collision with the biggest DBB 530 (representing this 0.5 sec simulation step width). If there is a collision, one takes then the lower DBB 520 (representing this 0.1 sec simulation step width and check again. Once it is decide on the next fractional time interval, all objects move to their position on that time, but collisions will be checked only for the defined pairs having a risk.

For example if at time 10, BDD 530 of Robot A is not colliding with part B, but BDD 530 of Robot C is colliding with part D, one will pick the next time interval to be 0.1 sec and all objects are moved in the simulation to their place at 10.1 sec. A collision check is done only between the BDD 520 of Robot C and part D.

Thus, it is now again determined for this next simulation step for the simulated movement of the object according to the set of relevant object control information after this fractional time interval whether an overlap of these first dummy bounding boxes 520 of the objects assigned to this pair of objects again occurs.

If there is also an overlap for these DBB 520, the fractional time interval will be further reduced resulting also in further smaller DBB and the comparison step is repeated or alternatively the real movement of the objects has to become subject for a deepened analysis whether a collision occurs or not.

In a preferred embodiment, the simulation steps with the fractional time interval are repeated until the sum of the fractional time intervals sums up to the amount of the given time interval wherein the time interval for the next simulation step is then set back to the given time interval. In other words, with reference to the example above, the steps with the time interval of 0.1 sec can be repeated five times without collision result until the simulation steps are then again resumed/executed with the original given time interval of 0.5 sec.

FIG. 6 illustrates a flowchart 600 of a method for detecting collisions events of movable objects in an industrial manufacturing environment. Such method can be performed, for example, by system 100 of FIG. 1 described above, but the "system" in the process below can be any apparatus configured to perform a process as described and can be generically named a computations resource.

In the virtual environment, a number of industrial objects are foreseen that form an industrial environment, such as a manufacturing environment in the car manufacture industry, discrete manufacturing industry, food and beverage industry, life science and pharma industry etc. In the real industrial process, these industrial objects collaborate together by use of appropriate object control data in order to achieve the intended result in terms of manufacturing, material handling etc.

At act 601, the method for detecting possible collisions of movable objects in an industrial manufacturing environment comprise the steps of defining for each object a set of relevant object control information enabling the calculation of maximal possible translation of the object for a given time interval. This relevant object control information can comprise for example robots joints information, such as joints length, joints max. speed, joints max. accerlation etc.

At act 602, the user defines a number of pairs of objects that may have a potential for collision and require therefore a collision check.

At act 603, for each movable object of the defined pairs of objects a dummy bounding box is created, said dummy bounding box providing a volume in response to the calculated maximal possible translation of the object at the end of a given time interval. This step is done for a number of different time interval T1<T2<...<Tn. Each time interval is therefore also present in the object by the time-specific dummy bounding box DBB. For example, the second dummy bounding box DBB 530 representing a given time interval of 0.5 sec reflect exemplarily here the maximum translation that the robot and its joint(s) is able to reach during this time interval of 0.5 sec regardless the robot has moved or not. In this case, it is a Heuristic method for the worse case.

At act 604, the simulation is run for the given time interval, thereby determining in this simulation step for a simulated movement of the object according to the set of relevant object control information after the given time interval whether an overlap of the dummy bounding boxes of the two objects assigned to one of the defined pairs of objects occurs.

At act 605, in case an overlap occurs, for the next simulation step the time interval is decrease to the next fractional time interval and only for the objects involved in the overlap the dummy bounding box related to this reduced time interval is used, said dummy bounding box providing a volume in response to the calculated maximal possible translation of the object at the end of a fractional time interval of said given time interval.

At act 606, it is determined in this simulation step for a simulated movement of the object according to the set of relevant object control information after the fractional interval whether an overlap of the adapted dummy bounding boxes of the objects assigned to a pair of objects still occurs.

At act 607, in case that still an overlap occurs, the simulation is continued for the next simulation step with a further reduced fractional time interval and the step aforementioned steps are repeated to identify whether there is still an overlap of the further dummy bounding boxes adjusted to the further decreased fractional time interval. Alternatively, the user will now review the real movement of the objects for a deepened analysis whether a collision in the real shop floor occurs or not. Thus, the user is herewith enabled to change the object control data for the movement and the trajectory of the object in order to avoid further collision. This method is therefore very efficient since the simulation is only continued with the decreased time intervals for those objects (object pairs) that show a possible collision (which is indicated by the overlap of the DBB's).

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for detecting possible collisions of movable objects in an industrial manufacturing environment, which comprises the steps of:
   a) defining for each movable object a set of relevant object control information enabling a calculation of a calculated maximal possible translation of the movable object for a given time interval;
   b) defining a plurality of defined pairs of the movable objects that may have a potential for collision;
   c) creating for each said movable object of the defined pairs of the movable objects a dummy bounding box, the dummy bounding box providing a volume in response to the calculated maximal possible translation of the movable object at an end of the given time interval;
   d) determining in a simulation step for a simulated movement of the movable object according to the set of relevant object control information after the given time interval whether an overlap of dummy bounding boxes of the movable objects assigned to a pair of the movable objects occurs;
   e) in case the overlap occurs, creating for each said movable object involved in the overlap a new dummy bounding box, the new dummy bounding box providing a volume in response to the calculated maximal possible translation of the movable object at an end of a fractional time interval of the given time interval;
   f) determining in the simulation step for the simulated movement of the movable object according to the set of relevant object control information after the fractional time interval whether an overlap of new dummy bounding boxes of the movable objects assigned to the pair of the movable objects occurs; and
   g) in a case where an overlap still occurs further reducing the fractional time interval and repeating the steps e) and f) or reviewing a real movement of the movable objects for deepened analysis on whether a collision occurs or not.

2. The method according to claim 1, wherein the given time interval is in a range of 0.1 to 1 sec.

3. The method according to claim 2, wherein the given time interval is chosen to be 0.5 sec and the fractional time interval is set to 0.1 sec.

4. The method according to claim 1, wherein in a case where the overlap still occurs, reducing again the fractional time interval for a next simulation step and repeating the steps e) and f) for a simulation only for the movable objects still involved in the overlap for a reduced fractional time interval for the next simulation step.

5. The method according to claim 4, wherein simulation steps with the fractional time interval are repeated until a sum of fractional time intervals sums up to an amount of the given time interval wherein a time interval for the next simulation step is then set back to the given time interval.

6. A data processing environment for detecting possible collisions of objects in an industrial manufacturing environment, the data processing environment comprising:

a) a control instance for defining for each object a set of relevant object control information enabling a calculation of a calculated maximal possible translation of the object for a given time interval;
   b) a user interface for defining a number of pairs of the objects that may have a potential for collision;
   c) a data processing instance for creating for each said object of defined pairs of the objects a dummy bounding box, the dummy bounding box providing a volume in response to the calculated maximal possible translation of the object at an end of the given time interval;
   d) said data processing instance further enabled to determine in a simulation step for a simulated movement of the object according to the set of relevant object control information after the given time interval whether an overlap of dummy bounding boxes of the objects assigned to the pair of the objects occurs;
   e) in case the overlap occurs, said data processing instance being further enabled to create for each said object involved in the overlap a new dummy bounding box, the new dummy bounding box providing a volume in response to the calculated maximal possible translation of the object at an end of a fractional time interval of the given time interval;
   f) said data processing instance determining in the simulation step for the simulated movement of the object according to the set of relevant object control information after the fractional interval whether an overlap of the new dummy bounding boxes of the objects assigned to the pair of the objects occurs; and
   g) in case that still an overlap occurs, said data processing instance being further enabled to further reduce the fractional time interval and repeat the steps e) and f) or said user interface being further enabled to review a real movement of the objects for deepened analysis on whether a collision occurs or not.

7. The data processing environment according to claim 6, wherein the given time interval is in a range of 0.1 to 1 sec.

8. The data processing environment according to claim 6, wherein the given time interval is chosen to be 0.5 sec and the fractional time interval is set to 0.1 sec.

9. The data processing environment according to claim 6, wherein in case that still the overlap occurs, reducing again the fractional time interval for a next simulation step and repeating the steps e) and f) for a simulation only for the objects still involved in the overlap for the reduced fractional time interval for the next simulation step.

10. The data processing environment according to claim 6, wherein simulation steps with the fractional time interval are repeated until a sum of fractional time intervals sums up to an amount of the given time interval wherein a time interval for the next simulation step is then set back to the given time interval.

11. A non-transitory computer-readable medium encoded with executable instructions that, when executed, cause a data processing environment for detecting possible collisions of objects in an industrial manufacturing environment, to:
   a) define for each object a set of relevant object control information enabling a calculation of a calculated maximal possible translation of the object for a given time interval;
   b) define a number of pairs of the objects that may have a potential for collision;
   c) create for each said object being a movable object of defined pairs of the objects a dummy bounding box, the dummy bounding box providing a volume in response to the calculated maximal possible translation of the object at an end of the given time interval;

d) determine in a simulation step for a simulated movement of the object according to the set of relevant object control information after the given time interval whether an overlap of dummy bounding boxes of the objects assigned to a pair of the objects occurs;

e) in case the overlap occurs, create for each said object involved in the overlap a new dummy bounding box, the new dummy bounding box providing a volume in response to the calculated maximal possible translation of the object at an end of a fractional time interval of the given time interval;

f) determine in the simulation step for the simulated movement of the object according to the set of relevant object control information after the fractional interval whether an overlap of new dummy bounding boxes of the objects assigned to the pair of the objects occurs; and g) in case that still an overlap occurs further reducing the fractional time interval and repeating the steps e) and f) or reviewing a real movement of the objects for deepened analysis on whether a collision occurs or not.

12. The non-transitory computer-readable medium according to claim 11, wherein the given time interval is in a range of 0.1 to 1 sec.

13. The non-transitory computer-readable medium according to claim 11, wherein the given time interval is chosen to be 0.5 sec and the fractional time interval is set to 0.1 sec.

14. The non-transitory computer-readable medium according to claim 11, wherein in case that still the overlap occurs, reducing again the fractional time interval for the next simulation step and repeating the steps e) and f) for a simulation only for the objects still involved in the overlap for the reduced fractional time interval for the next simulation step.

15. The non-transitory computer-readable medium according to claim 11, wherein the simulation steps with the fractional time interval are repeated until a sum of fractional time intervals sums up to an amount of the given time interval, wherein a time interval for the next simulation step is then set back to the given time interval.

* * * * *